Sept. 15, 1936.  W. I. SENGER  2,054,141
TRANSMISSION AND CONTROL MECHANISM
Filed May 31, 1935   4 Sheets-Sheet 2

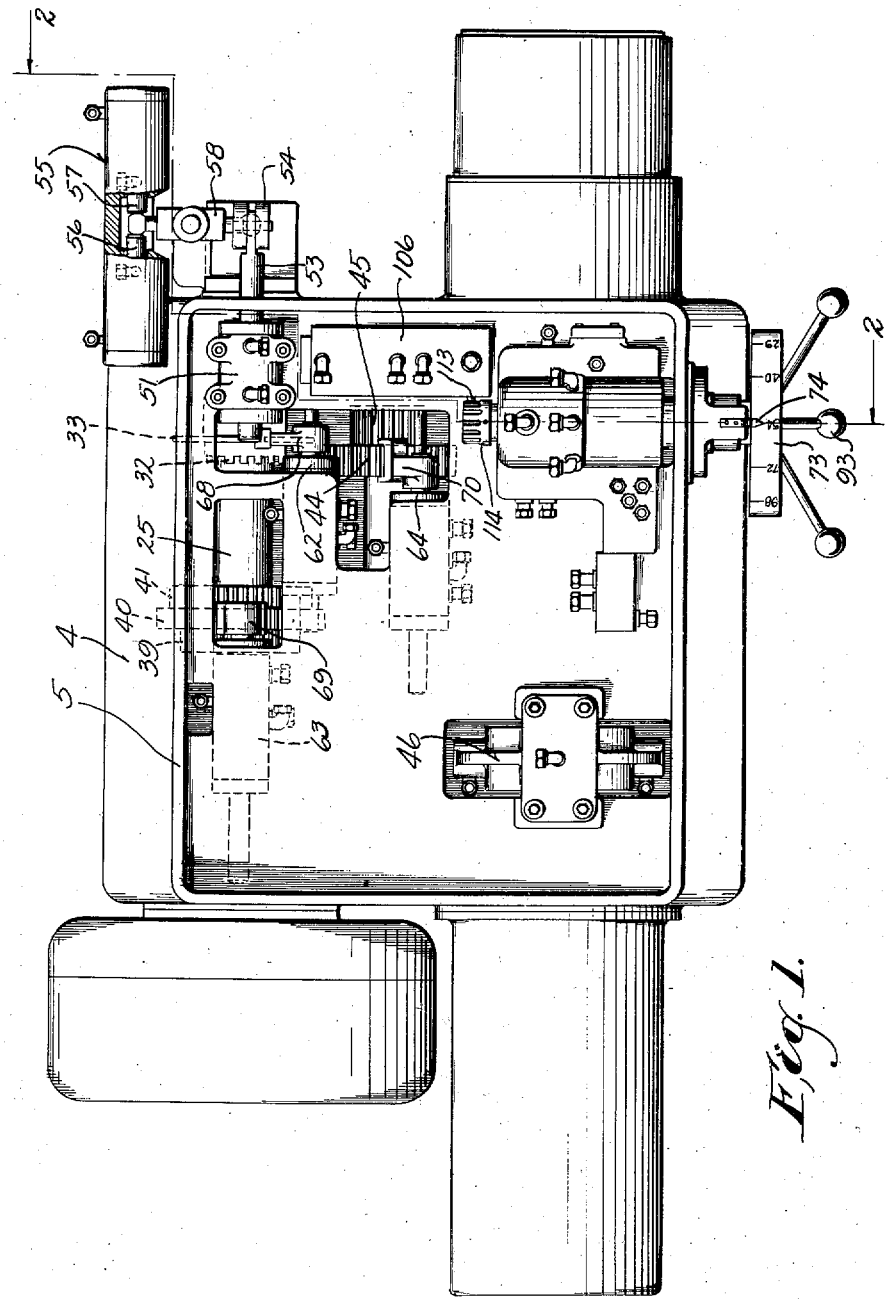

INVENTOR
Werner Irving Senger
BY
Fred G. Parsons
ATTORNEY

Patented Sept. 15, 1936

2,054,141

UNITED STATES PATENT OFFICE 2,054,141

TRANSMISSION AND CONTROL MECHANISM

Werner Irving Senger, Madison, Wis., assignor to Gisholt Machine Company, Madison, Wis., a corporation of Wisconsin Application May 31, 1935, Serial No. 24,201

49 Claims. (Cl. 82—29)

REISSUED MAR 26 1940

This invention relates to transmission and control mechanism for machine tools, etc., and more particularly for the spindle transmission of a lathe.

A purpose of the invention is to provide improved and more conveniently operated mechanism for the shifting of various elements of a transmission, as for instance a rate changer, a clutch or reverser, and a brake.

A further purpose is to provide an improved transmission and control in which rate changes and other operations may be effected by power, and more particularly by hydraulic power.

A further purpose is to provide an improved device for selecting and power shifting the elements of a machine tool rate changer, so arranged that selective portions of the device cannot be moved for rate selection except at such time as power is available for the shifting, whereby, among other advantages, to obtain a rate indicating device which invariably indicates the rate effect of the rate changer.

A further purpose is to provide an improved rate change device for a machine tool having a rate changer driven through a reverser or motion interruptor, in which the control mechanism for the rate change and for the reverser or interruptor are interrelated or interconnected in a preferred and improved manner, as for instance to prevent a rate change being effected except under preferred conditions or positions of the reverser or interruptor.

A further purpose is to effect an improved control for a transmission having a rate changer and other adjustable devices, as for instance a reverser, a brake or an interruptor, in which for the purpose of effecting a rate change there is an inter-related operation of the rate changer and one or more of the other devices, but for other control purposes there is an independent operation of the other devices.

A further purpose is to effect an improved rate change device in which, as an incident to rate changing, the power transmission to the rate changer is interrupted before shifting the rate changer, and connected again immediately following completion of the rate change.

A further purpose is to provide an improved control mechanism for a rate changer having a reversible driving connection, in which the driving connection is interrupted prior to the shifting of the rate changer, and is immediately returned, following the rate change, to drive the rate changer in the same direction as before.

A further purpose is to provide an improved shifting device for a rate changer having a serial arrangement of shiftable rate change elements or groups of elements, in which the shifting of the required elements to change from any available rate to any other available rate will invariably proceed in a sequence such that the elements or groups will be shifted one at a time in a desired order.

A further purpose is to provide an improved device for control of a rate changer productive of a relatively large number of different rates, in a manner such that selection of a desired rate may be instantly made irrespective of the preceding rate and the shifting to effect the selected rate will be selectively performed without necessity for passing through one or more element position combinations productive of other rates, in other words, in a manner such that a change from any available speed to any other may be directly accomplished.

Another purpose is to provide a rate change mechanism which permits of changing directly from a relatively low to a relatively high speed, or vice versa, without shock or damage to the mechanism.

A further purpose is to provide an improved rate change device in which a rate selective device moves through a sequence of positions corresponding to the sequence of rate effects available yet any number of rate positions may be passed through in reaching a desired position without effecting any undesired intermediate rates of the driven end of the transmission.

A further purpose is to provide an improved control for effecting rate changes in a machine tool which makes it unnecessary to separately operate the main clutch or other elements of the machine during rate changes.

A further purpose is generally to simplify and improve the construction, operation and relationship of transmission and control mechanism of a machine tool, particularly when the transmission includes reverser or interruptor devices, a brake device and a rate change device; and still other objects will be apparent from this specification.

The invention consists in the construction and arrangement of parts as herein illustrated, described and claimed and in such modification thereof as are equivalent to the structure claimed.

In the drawings the same reference characters have been used to indicate the same parts in each of the several views.

Fig. 1 shows a top view of the headstock and spindle drive portion of a lathe in which the invention is incorporated, a cover plate being removed to show certain control devices.

Fig. 2 shows a partial vertical section of the same machine, taken along a line 2—2 of Fig. 1.

Figure 4:
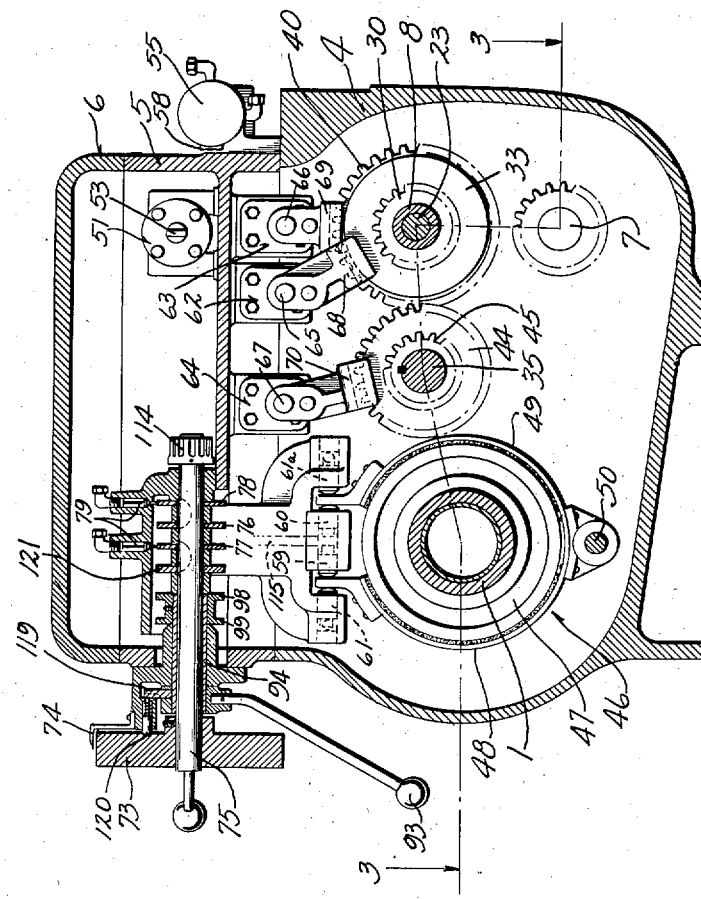
Fig. 4 is a more or less diagrammatic view showing certain control mechanism for the machine of Fig. 1 and certain interconnection thereof.

The machine tool shown in the drawings is a lathe having a work spindle 1, a power source associated with the machine, which in this case is a drive pulley 2, and a feed train, mostly not shown, driven from the pulley 2 through spindle 1 and originating in a gear, such as 3, fixed with spindle 1. It will be understood that the lathe has suitable tool supports, not shown, of any well known form, operable at feed rate through a gear such as gear 3 in any suitable manner.

A transmission mechanism for rotation of spindle 1 is housed in a hollow casing or headstock 4, Fig. 2, having a cover plate or member 5, which carries a number of shifting and control devices and is removable for exposing the transmission for inspection, etc., and having another cover plate 6, which is removable for exposing the control devices.

The pulley 2 is preferably driven at constant speed, and drives a shaft 7 on which the pulley is fixed, a shaft 8 driven from shaft 7 through a reverser and motion interruptor generally denoted by the numeral 9, and serially arranged rate change devices including a shiftable rate change device generally denoted by the numeral 10, a shiftable rate change device generally denoted by the numeral 11, and a shiftable rate change device generally denoted by the numeral 12.

The reverser-interruptor 9 includes a pair of meshed gears 13, 14 respectively fixed on shaft 7 and rotatable on shaft 8, and a pair of sprockets, 15, 16, not meshed, respectively fixed on shaft 7 and rotatable on shaft 8, the sprockets 15 driving the sprocket 16 through a chain 17 engaging both sprockets. This arrangement continuously drives gears 14, 16 in opposite direction. Fixed with gears 14, 16 respectively are outer clutch members 18, 18', and slidably keyed on shaft 8 is an inner clutch member 19. Groups of friction plates 20, 21 are respectively associated with the different clutch members 17, 18, the alternate plates of each group being slidably keyed to the outer and inner clutch members. The inner clutch member 19 is engaged by pivoted lever members such as 22 which may be swung on their pivots by the axial movement of a shifter rod 23 extending through an axial bore of shaft 8 and having a shifter spool 24 by which the rod may be shifted in the one direction or the other to frictionally engage the opposed plates of either group 20, 21 whereby to drive shaft 8 in either direction. The rod 23 may also be shifted to an intermediate position in which the plates of both groups 20, 21 are disengaged and shaft 8 is disconnected from the drive pulley 2.

The spindle may be driven at different rates by the means of transmission mechanism as follows:—Shaft 8 drives a sleeve 25, rotatably supported thereon, through the rate change device 10, which includes a pair of meshed gears 26, 27 respectively fixed on the sleeve 25 and on a sleeve 28 rotatably supported on the shaft 7, a gear 29 also fixed on sleeve 28, and a shiftable unit including a gear 30 fixed with a sleeve 31 which is slidably keyed on the extended end of shaft 8, and a clutch member 32 at the end of sleeve 31. Sleeve 31 also carries a shifter element 33, by the means of which it may be shifted in the one direction to engage gear 30 to drive sleeve 25 from shaft 8 through the gears 29, 27, 26, or may be shifted in the other direction to drive sleeve 25 directly from shaft 8 through the clutch member 32 and a complementary clutch member 34 fixed on the end of sleeve 25. Sleeve 25 drives a shaft 35 through the rate change device 11 which includes gears 36, 37, 38 fixed on the shaft 35 and gears 39, 40, 41 fixed together and slidably keyed on sleeve 25 for engagement one at a time with gears 36, 37, 38 respectively. Shaft 35 drives spindle 1 through the rate change device 12 which includes gears 42, 43 fixed on spindle 1 and gears 44, 45 fixed together and slidably keyed on shaft 35 for engagement one at a time with the gears 42, 43 respectively. The several rate change devices 10, 11, 12 provide a rate changer which, together with reverser 9 provides 12 different rates of spindle rotation in either direction and substantially in geometrical progression.

A brake generally denoted by the numeral 46, Fig. 2 is provided for spindle 1 and includes a brake drum 47 fixed on the spindle, and a pair of brake shoes 48, 49 each pivoted on a pin 50 fixed in housing 4, to frictionally engage the brake drum when the upper end portions of the shoes 48, 49 are forced toward one another.

Power operable means are connected for the operation of reverser 9, rate change devices 10, 11, 12 and brake 46 as follows.

Figure 5:
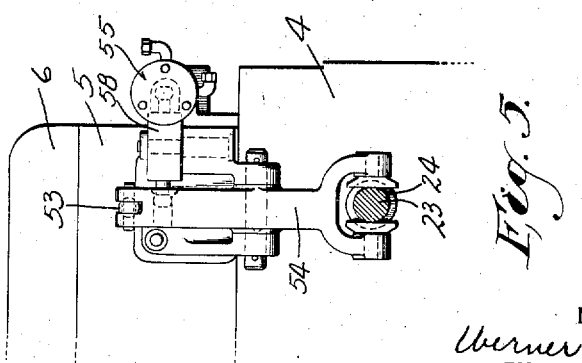
Fig. 5 is a partial view from the left in Fig. 1 showing part of the mechanism for shifting the reverser of the drive train shown in Fig. 3.

For the reverser-interruptor 9, a first piston device generally denoted by the numeral 51, Figs. 1, 4 is fixed on plate 5 and includes a piston 52 having a piston rod 53 connected for movement of a pivoted lever 54, Figs. 4, 5, which, at its lower end has pivoted shoes engaging the annular groove of the spool 24 fixed on the end of shifter rod 23. A second piston device 55 for the reverser interruptor includes two pistons 56, 57 continuously urging a pivoted lever 58, which engages the upper end of lever 54, toward central position. The piston 52 is of larger effective area than the pistons 56, 57 and if fluid is admitted to either face of piston 52 the pistons 56, 57 will be overcome and the reverser 9 moved by piston 52 to the one or the other of its engaged positions, but if the pressure is released on piston 52 the pistons 56, 57 will immediately move the reverser 9 to motion interrupting position.

For the spindle brake 46 there is provided two pistons 59, 60, Figs. 2, 4, respectively for urging the different brake members 48, 49 to released position, and two pistons 61, 61a continuously urging the members 48, 49 to engaged position, the pistons 59, 60 being of largest area whereby, when supplied with fluid, to overcome pistons 61, 61a. The pistons 61, 61a are continuously supplied with fluid and therefore whenever the fluid supply is interrupted to the pistons 59, 60 the spindle brake 46 will operate.

For the respective speed change devices 10, 11, 12 there are provided piston devices 62, 63, 64 Figs. 1, 4 having similar pistons 65, 66, 67, and having fixed on the piston rods thereof the shifter members or forks 68, 69, 70, respectively engaging the shifter element 33 and the gears 40 and 44.

Figure 3:
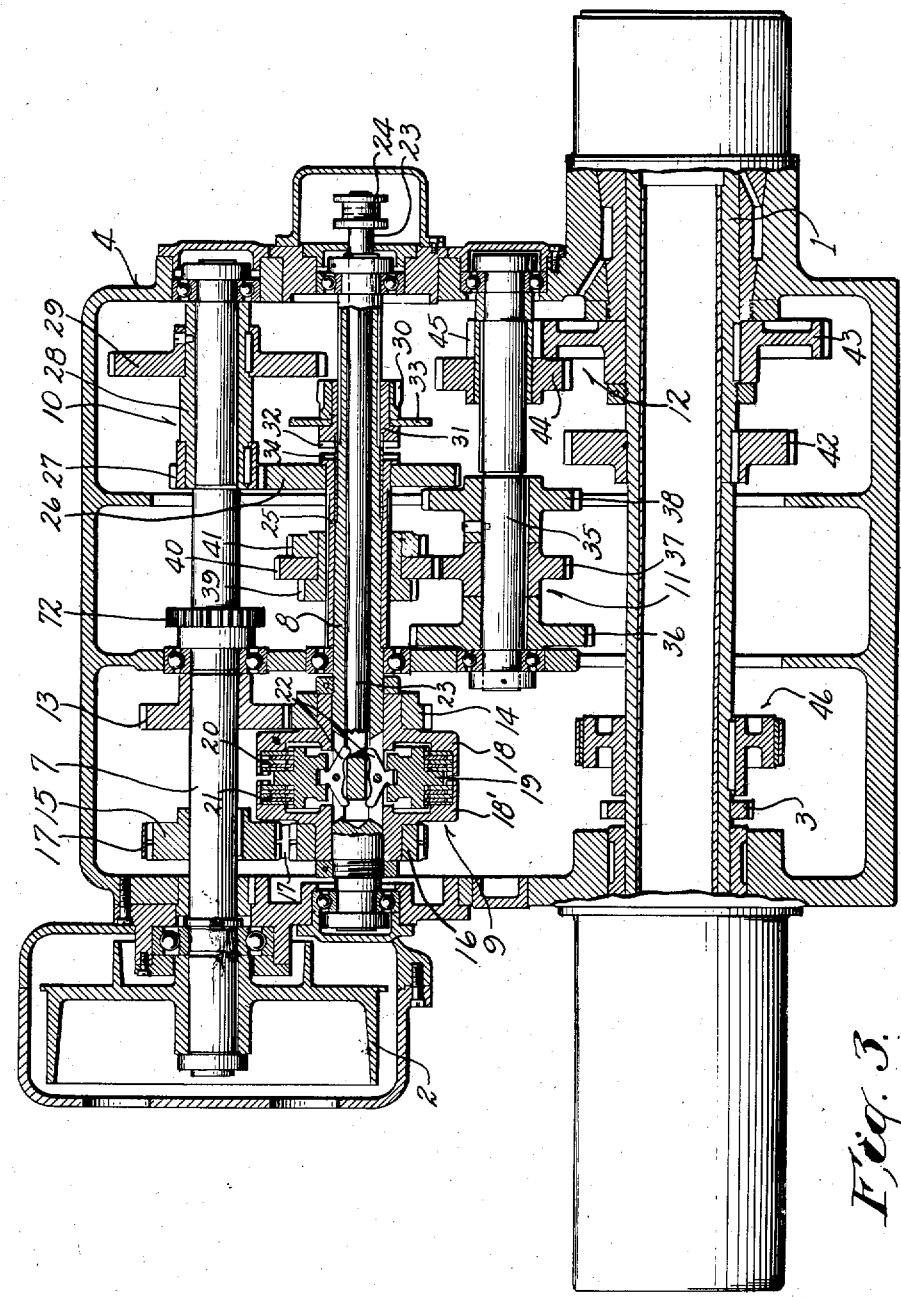
Fig. 3 is a development of the drive train leading to the spindle of the machine on a section taken approximately along the line 3—3 in Fig. 2.
Figure 4:
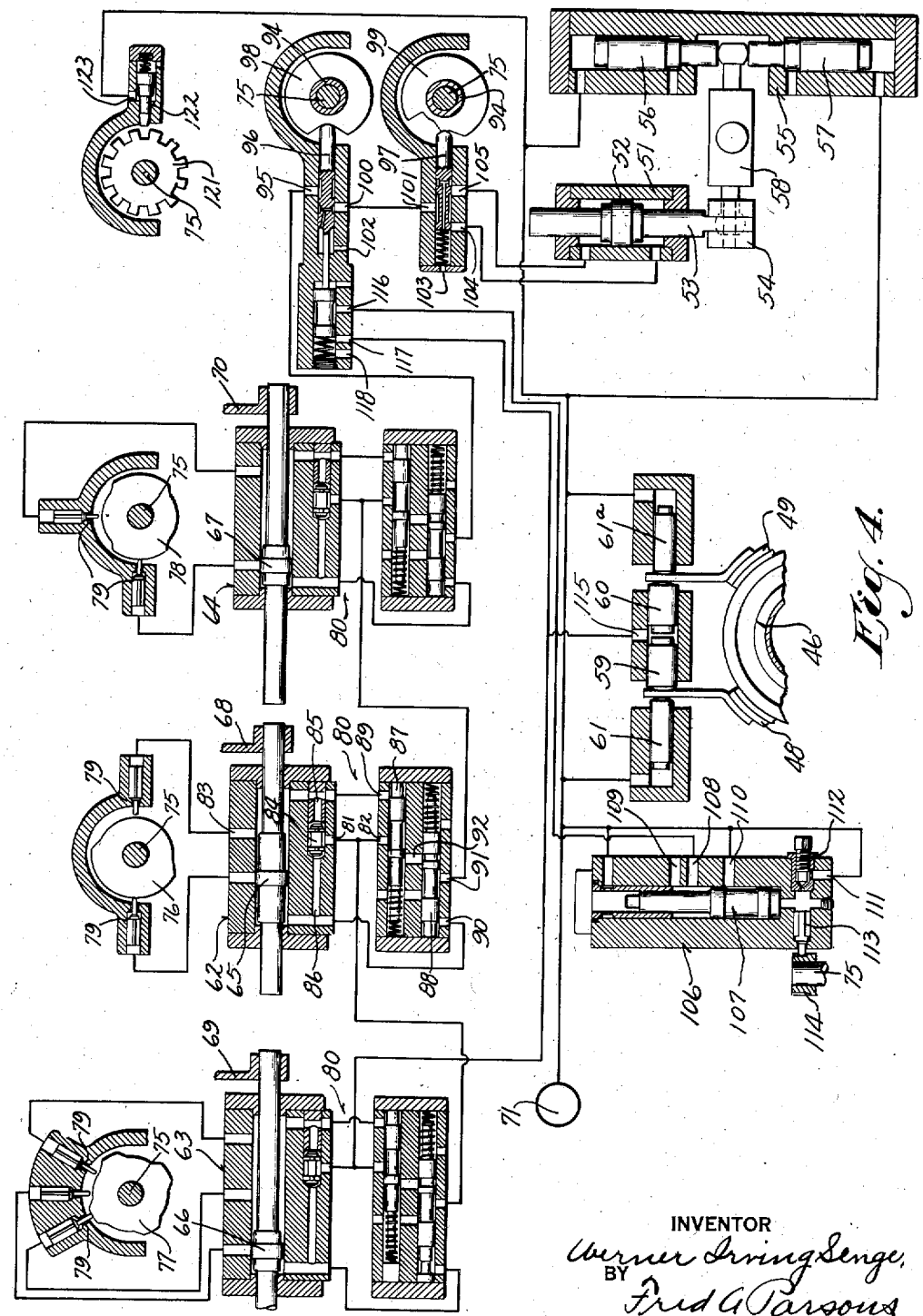

For the operation of the several piston devices fluid under pressure is constantly supplied, at least whenever the pulley 2 is running, from any suitable source, preferably a pump of any suitable type, as indicated at 71, Fig. 4, and connected to be driven from shaft 7, as for instance from a gear 72, Fig. 3, and drawing oil from a sump in the bottom of the hollow casing 4. Waste oil and surplus oil from the pump 71 may be used to lubricate the transmission mechanism shown and other portions of the machine which require lubrication.

Control means for the operation of the several piston devices is as follows:

A speed selector dial 73, Figs. 1, 2 is provided with markings corresponding to the spindle speeds available from the transmission and reads against an indicator pointer 74. Dial 73 is fixed on a shaft 75 upon which are also fixed cams 76, 77, 78, Figs. 2, 4, respectively for the control of the piston devices 62, 63, 64. These cams are formed for operation of pressure releasing poppet valves such as the valves 79 arranged adjacent to the cams, the position of the several valves and the shape of the cams being such that in each of the 12 positions of speed dial 73 one of the poppet valves associated with each of the cams is open and the others are closed. The valve positions and cam forms also provides that during rotation of dial 73 the opening of the one or the other poppet valve for the speed change units proceeds in a sequence corresponding to the shifting movements required in order to produce the various spindle speeds in numerical order. Also associated with each of the piston devices 62, 63, 64 are valve means similar to the valve means 80, Fig. 4, which are controlled by the poppet valves 79 to effect the piston movements corresponding to the operation of the poppet valves. These valve means are substantially the same for each piston device and will therefore be described in detail only for the piston device 62.

Referring to the valve means 80, and piston device 62, in Fig. 4, fluid is delivered to the device through the valve ports 81, 82. The piston 65 is there shown in its left hand position, which is the position assumed whenever the cam 76 forces the left hand poppet valve 79 open, as there shown. But when the cam 76 is turned to open the right hand poppet valve 79 the left hand valve closes, and then a sequence of events will occur, resulting in movement of the piston to the right, as follows. The pressure will then be relieved in the right hand end of the cylinder of piston 65 through a port 83 leading to the open poppet valve, oil will flow through a channel 85 from port 81, and thereupon a blocking valve or plunger 84 is urged to the right by the flow of fluid through the channel 85, seating the blocking valve 84 to the right and closing the channel 85 to prevent further leakage from the supply port 81 through the poppet valve. A channel 86, continues to supply pressure fluid to the left hand end of the piston 65, and since there is no pressure on the right hand end, the piston moves to the right. Two valves 87, 88 are continuously spring urged in opposite directions to the positions shown in Fig. 4, but are normally forced to the left and right, respectively, against the spring pressure, by the pressure of fluid acting on the valve ends, respectively through ports 89, 90. In the positions shown both valves block any passage of fluid to a port 91 which leads to the next of the valve devices of the series, but it will be seen that if the valves were in the normal position a passage exists from port 82 to the port 91 through the annular grooves of the valves and through the intermediate passage 92. At the start, and during the movement of piston 65 to the right, the valve 88 continues in the normal position to the right of the position shown in Fig. 4. But immediately when the right hand poppet valve 79 was opened the fluid pressure holding valve 87 in normal position bleeds off through port 89 and the open poppet valve and therefore, during the entire right hand movement of piston 65, the fluid path past valve 87 is closed. Similarly, during a left hand movement the fluid path would be closed by the valve 88, although the valve 87 would then be open. But when the piston 65 has completed its movement in either direction, the leak path to the open poppet valve is closed by the piston, which then covers the port 83, or a port 92, as the case may be, and the pressure then rises and opens the closed valve 87 or 88, whereby the fluid may pass from port 82 to the port 91 and on to similarly operate the next piston device in the series. By this arrangement of valves similar to the valve means 80, the speed shifter piston devices 63, 62, 64 are restricted to act separately, one after another in the order just stated.

It will be noted that although the piston 66 has three positions, corresponding to the three positions of the gear set 39, 40, 41 the operation upon opening any one of the three poppet valves 79 associated with cam 77 is the same as that just described, for piston 65. The piston 66 moves until it covers the port leading to the open poppet valve, and except that there are three such ports instead of two, the operations are identical.

Should it occur that the rate selective adjustment of selector dial 73 does not require movement of one or more of the rate change devices 10, 11, 12 then the action above described does not take place as to the piston and valves for those devices. The piston remains in previous position and the valve means corresponding to valve means 80 continue in normal position, permitting the fluid to pass freely to operate the next device in the series, whenever a rate selective movement effects no change in the positions of the poppet valves of that piston.

The reverser 9 is controlled manually by a hand lever 93, Fig. 2, which has a central position where the reverser is disengaged and positions at either side of central respectively for reverser engagement for the different directions of spindle rotation. The control mechanism is as follows. Lever 93 is fixed with a sleeve 94 co-axial with shaft 75 but independently rotatable. Reverser piston 52, Fig. 4, is shifted by fluid derived from a port 95 through two valves 96, 97 which are spring pressed against the cams 98, 99, Figs. 2, 4, respectively, each of the cams being fixed on sleeve 94. Cam 98 and valve 96 are of such form and relationship that when lever 93 is in central position the port 95 is closed to a port 100 which communicates with the supply port 101 of the valve 97, and the port 100 then communicates through the grooves and small channels shown in Fig. 4 with a drain port 102, whereby to relieve the pressure on piston 52 and permitting the pistons 56, 57 to operate to shift the reverser 9 to central disengaged position. In either of the other positions of lever 93, the valve 96 is positioned to close the drain port 102 and to supply fluid to the valve 97. Valve 97 and cam 99 are of such form and relationship that in the central position of lever 93 both ends of piston 52 communicate with ports 101 and 100, and therefore the fluid will drain as described from piston 52, to permit the clutch 9 to return to neutral position from either engaged position. But in either clutch engaged position of lever 93 one end of the piston 52 is connected to the fluid supply port 101 while the other end is connected to the drain channels 103, either directly, in the instance of the port 104, which supplies the one end of the piston, or through the small axial bore shown in the valve 97, in the instance of the port 105, which supplies the other end of the piston. By the means described the reverser-interruptor clutch 9 may be shifted by fluid pressure to any of its three operative positions accordingly as hand lever 93 is correspondingly positioned.

Before the spindle rate changer is shifted to effect any change in speed, the reverser clutch 9 is disengaged and the spindle brake 46 is engaged to stop or to slow down spindle rotation. This result is obtained in the following manner.

The fluid from pump 71 for operation of the rate change devices 10, 11, 12 is derived through a timer device generally denoted by the numeral 106, Figs. 1, 4 and which includes a plunger valve 107 continuously urged by fluid pressure on the small end of the valve. The plunger valve 107 is, however, normally held, by means of fluid pressure on the large end of valve 107, in a position for a port 108, which is connected to the rate change shifters 62, 63, 64 to receive fluid from a supply port 110. The pressure on the larger valve end is derived from a port 111 through an adjustable needle valve device 112. A poppet valve 113 may be opened to relieve the pressure acting on the larger end, upon which the valve 107 is immediately forced by the pressure on the small end to a position where no fluid is supplied to the port 108, the port 108 then being connected to a drain port 109, and the valve does not return to normal position again until after an interval in which sufficient fluid can leak through the needle valve 112 to force the valve back against the pressure on the small end. Mounted on the end of the shaft 75 is a notched cam 114, Figs. 1, 4 the notches of which are so positioned relative to the cams 76, 77, 78 and speed dial 73 that in each speed position of the dial and shaft the exposed end of poppet valve 113 is opposite a notch, and the poppet valve is closed. But in passing from any one to another speed position the end of the poppet valve will be forced back by at least one of the intermediate high portions of cam 114, the poppet valve will be opened, and the valve 107 will move to the position where the port 108 receives no fluid and is open to the drain port 109. Immediately the speed dial and shaft 75 have arrived at the desired speed position the poppet valve end again is opposite a notch and the poppet valve closes, but as previously pointed out, valve 107 remains in the position draining the port 108 and the speed change pistons until sufficient fluid has leaked through the needle valve 112 to force the valve 107 back to the position where ports 108 and 109 again communicate with one another. This interval can be varied by the adjustment of the needle valve 112, but is always sufficient for the operation of the reverser 9 to disengaged position and for application and release of the spindle brake 46, before the start of the movement of the speed change pistons, these operations being effected as follows.

The reverser operating piston device 51 is supplied with fluid through port 101 as previously stated. Port 101 receives fluid from the last operated of the rate change devices 62, 63, 64, and therefore, when the port 108 of the supply line leading to the shifter pistons is connected with the drain port 109 as described, the pressure is also relieved on the reverser piston 52, and the reverser pistons 56, 57 then immediately shift the reverser to central disengaged position. And even after fluid is again supplied to the port 108 by the return of the valve 107 to its normal position, the reverser supply port 101 will receive no fluid until the last of the series of rate shifter piston devices 62, 63, 64 has operated, by reason of the explained mode of operation of the valve means 80. It will thus be seen that, preceding each rate change the reverser 9 will be disengaged, and will not engage again until the rate change is completed, after which the reverser piston 52 will again be supplied with fluid to overcome the pistons 56, 57, whereby to return the reverser to whatever position it occupied, before the rate change was started, since the reverser direction valve 97 has not been disturbed by the rate change operation.

As stated, the brake 46 is applied to spindle 1 to stop the spindle before each speed shift. The operation is as follows. The brake releasing pistons 59, 60 are supplied with fluid from a port 115, Fig. 4, which derives its fluid from the port 108 of the timer device 106, and therefore when the timer device operates, preceding each rate change, to connect the port 108 to the drain port 109, as previously described, the pistons 59, 60 then fail to oppose the continuously supplied pistons 61, 61a and the brake becomes effective. But since the port 115 is connected with the supply line leading from port 108 to the first of the speed shift devices 62, 63, 64 the brake will be released again after the operation of the timer device 106 and before or simultaneously with the operation of the first of the rate change devices.

Brake 46 is also operated to stop the spindle quickly, and to lock it in position when the reverser control hand lever 93 is moved to the central position to disengage the reverser 9. This is accomplished by directing the fluid supply to the port 115 of the brake release pistons 59, 60 through ports 116, 117 of reverser valve 96. When valve 96 is moved to the position, shown in Fig. 4, corresponding to the disengaged position of reverser 9, then the line leading from port 117 to brake pistons 59, 60 is connected to the drain port 118, and the continuously supplied pistons 61, 61a then operate to apply the brake.

The connections from port 108 through ports 116, 117 as just described also operate to make it impossible to effect a rate change when the reverser control lever 93 is positioned in the central position for disengagement of reverser clutch 9. The speed shift devices, 62, 63, 64 as well as brake 46 are supplied with fluid through port 117, and when that port is connected to the drain port 118 as just described no rate change can take place.

From the foregoing description it will be seen that the manner of reverser clutch and brake operation depends upon whether such operation originates in the movement of the rate selector member 73 or in the movement of the control lever 93. When operation is from lever 93 either the reverser clutch or the brake is engaged. But when the operation is from the speed selector device it occurs first that the reverser clutch is disengaged at substantially the same time that the brake is engaged, thus quickly interrupting the drive. Following this the brake is disengaged and both the brake and reverser clutch remain disengaged during the engagement of the rate change units 10, 11, 12, in their new positions. When the brake and clutch are both disengaged friction or oil drag between the plates of the one or the other of the sets of clutch plates 20, 21 normally causes a slow impositive rotation of shaft 8 and the shafts driven therefrom, which prevents the ends of engaging rate change elements from abutting in positions which might delay their engagement, and expedites the rate change operation.

It is not desirable to permit the speed change dial 73 to be moved at times when the port 117 is connected to the drain port 118, as just described whereby there is no fluid available for the shifting of the speed change devices. Means are therefore provided, preventing movement of the speed change dial, and of shaft 75, when reverser control lever 93 is in central position, as follows. A cam member 119, Fig. 2, is fixed to move with the hand lever 93 for movement of a spring pressed plunger 120 which normally operates as a detent for the dial 73, engaging with suitable notches in the dial to define the speed effecting position thereof. But in the central position of the lever 93, a high point on the cam 119 provides an abutment preventing the plunger 120 from moving out of the notch in the dial 73, and the dial 73 cannot be turned. In the other positions of the lever 93 suitable notches or low points in the cam 119 permit plunger 120 to operate normally to move out of its dial notch, and the dial and shaft may then be turned to effect a rate change.

The dial 73 and shaft 75 are also locked to prevent movement in the event that, for any reason, the pressure of the fluid supply falls below the point where it will effect the control operations previously described. For this result there is provided a disc 121, Figs. 2, 4 fixed on shaft 75 and having notches adapted to be engaged by a spring pressed plunger 122, in any speed position of the dial 73 and shaft 75, and to prevent shaft movement when engaged. The plunger spring is continuously opposed by fluid pressure derived directly from pump 71 through the port 123, and therefore only engages the notches when the fluid pressure fails for any reason, as, for instance when there is no power supplied to the drive shaft 7.

It will be understood that the ports or channels of the various piston and other devices are suitably connected by piping and pipe fittings indicated by the line connections shown in Fig. 4. The connecting piping, for clearness, is not shown in the other views.

An illustrative cycle of operation of the transmission and control device is as follows. Assuming that rotation of spindle 1 has been stopped by centrally positioning the hand lever 93, Fig. 2, whereby reverser 9, Fig. 3, is centrally positioned for interruption of the drive train and spindle brake 46 is engaged, as previously described. If now it is desired to start the spindle rotating at a new speed the operation may proceed as follows: Lever 93 is shifted in the one or the other direction, according to the direction of rotation desired, whereupon cam 98, Fig. 4 shifts valve 96 to close the port 117 against the drain port 118, at the same time connecting port 117 to pressure fluid through port 116. This immediately releases brake 46 by the application of pressure fluid to pistons 59, 60 through port 115, and supplies pressure to the several control valves 80 respectively for the different rate shifter pistons 65, 66, and 67, and finally supplies pressure fluid to the ports 95 and 100 which are now connected.

The same movement of hand lever 93 also moves cam 99, Fig. 4 to shift valve 97, whereby to connect the port 100 through the one or the other of ports 104, 105 to the reverser shifter piston 52, shifting that piston in the desired reverser direction and overcoming the smaller continuously supplied pistons 56 or 57. This completes the operation of releasing the brake 46 and starting rotation of spindle 1, which will now be rotating in the desired direction at the speed indicated by the speed selector dial 73, Fig. 1.

If it is now desired to change the spindle speed the operation of the device for such effect is as follows: Speed selector dial 73, Fig. 1 is turned in either direction until the desired new speed is indicated by the pointer 74, whereby to position the cams 76, 77, 78, Fig. 4, to position the several poppet valves 79 in a combination effective to control the several valve devices 80 to apply pressure to move the pistons 65, 66, 67 to effect the necessary new position combination of the speed change devices 10, 11, 12, Fig. 3, as previously described.

As soon as dial 73 is moved out of its previous speed position the cam 114, Fig. 1 operates to open the poppet valve 113, Fig. 3, to release the pressure continuously supplied to the lower end of the plunger valve 107, Fig. 4, through the needle valve device 112, whereupon the pressure continuously supplied to the other end of the plunger valve shifts the valve downwardly in Fig. 4, to the position there shown, thus opening port 108 to a drain channel 109 and releasing the pressure on each of the several shifter pistons 65, 66, 67, on the reverser piston 52 whereby the continuously supplied pistons 56, 57 become effective to shift reverser 9 to central non-driving position, and on brake pistons 59, 60, whereby continuously supplied pistons 61, 61a become effective to apply the brake 46. This condition maintains until the speed selector dial 73 has remained in the new speed position, closing poppet valve 113, sufficiently long for the needle valve 112 to again supply sufficient fluid to force the plunger valve 107 upwardly in Fig. 4 to the position again closing drain port 109 from port 108 and connecting port 108 to the supply port 110.

When port 108 is again connected to the supply port, as just described, it first occurs that pressure fluid reaches brake pistons 59, 60, releasing the brake 46 and permitting such slow rotation of the spindle train as may be brought about by the relatively slight drag of the interengaged clutch plates 20, 21, Fig. 3. Next it occurs that the valve shifter plungers 65, 66, 67 are shifted one after another to effect the position combination of rate change devices 10, 11, 12 required for the new speed, the order of shifting being determined by the interconnection of valves 80, as previously herein described. Finally, and following the shifting of the last shifter plunger required to be moved to effect the new speed, pressure is again applied, through ports 95, 100, 101 and 104 (or 105) to shift reverser piston 52 to again effect the reverser position determined by the position of the hand lever 93 and the valve 97 controlled thereby.

Any spindle speed within the range of the machine may be obtained as described in either direction, the direction being determined by the position of lever 93 to the one or the other side of its central position, and in shifting the lever from forward to reverse position the brake 46 acts at the intermediate lever position by reason of the release of pressure from brake pistons 59, 60 through the opening of drain port 118 to the port 117 in the resulting intermediate position of valve 96. By this operation of brake 46 the spindle transmission is relieved of some of the strains which might otherwise be set up during reversal.

To stop the spindle rotation, lever 93 is moved to its central position, whereby valve 96 is moved to the position shown in Fig. 4, and pressure on reverser piston 52 is relieved through the connection of port 117 to drain port 118 as previously described, the pressure from port 115 acting on brake pistons 59, 60 being relieved at the same time, thereby permitting reverser pistons 56, 57 to shift the reverser to its central position and brake pistons 61, 61a to simultaneously apply brake 46.

What is claimed is:

1. In a machine tool having a transmission including a rate changer providing a plurality of shiftable speed change devices serially arranged, the combination of a plurality of power operable shifter devices respectively for the different speed change devices, a rate selector device including a chart having markings indicating various rates corresponding to different position combinations of said speed change devices and an indicator movable relative to said chart, a power train connectible with said shifter devices, and control means for the connection of said power train to operate said shifter devices in accordance with the relative position of said chart and indicator, said control means including means restricting the operation of said shifter devices to operation one at a time.

2. In a machine tool having a transmission including a rate changer providing a plurality of shiftable speed change devices serially arranged, the combination of a plurality of fluid operable piston devices respectively connected for the operation of different of said speed change devices, a rate selector device including a chart having markings indicating various rates corresponding to different position combinations of said speed change devices and an indicator movable relative to said chart, a source of hydraulic pressure connectible with said piston devices, and control means including valve means operable from said selector device and controlling the connection of said pressure source to operate said piston devices in accordance with the relative positions of said chart and indicator, said control means including means restricting the resulting operation of said piston devices to a predetermined sequence, one at a time.

3. In a machine tool having a transmission including a rate changer providing a plurality of shiftable speed change devices serially arranged, the combination of a plurality of power operable shifter devices respectively for the different speed change devices, a rate selector device including a chart having markings indicating various rates corresponding to different position combinations of said speed change devices and an indicator movable relative to said chart, a power train connectible with said shifter devices, and control means for the connection of said power train to operate said shifter devices in accordance with the relative position of said chart and indicator, said control means including means delaying the connection of said power train for operation of any of said shifter devices during relative adjustment of said chart and indicator.

4. In a machine tool having a transmission including a rate changer providing a plurality of shiftable speed change devices serially arranged, the combination of a plurality of fluid operable piston devices respectively connected for the operation of different of said speed change devices, a rate selector device including a chart having markings indicating various rates corresponding to different position combinations of said speed change devices and an indicator movable relative to said chart, a source of hydraulic pressure connectible with said piston devices, and control means including valve means operable from said selector device and controlling the connection of said pressure source to operate said piston devices in accordance with the relative position of said chart and indicator, said control means including means delaying the connection of said pressure source for operation of any of said piston devices during relative adjustment of said chart and indicator.

5. In a machine tool having a transmission including a rate changer providing a plurality of shiftable speed change devices serially arranged, the combination of a plurality of power operable shifter devices respectively for the different speed change devices, a rate selector device including a chart having markings indicating various rates corresponding to different position combinations of said speed change devices, and an indicator movable relative to said chart, a power train connectible with said shifter devices, and control means for the connection of said power train to operate said shifter device in accordance with the relative position of said chart and indicator, said control means including means restricting the operation of said shifter devices to operation one at a time, and including means delaying the connection of said power train for operation of any of said shifter devices during relative adjustment of said chart and indicator.

6. In a machine tool having a transmission including a rate changer providing a plurality of shiftable speed change devices serially arranged, the combination of a plurality of fluid operable piston devices respectively connected for the operation of different of said speed change devices, a rate selector device including a chart having markings indicating various rates corresponding to different position combinations of said speed change devices and an indicator movable relative to said chart, a source of hydraulic pressure connectible with said piston devices, and control means including valve means operable from said selector device and controlling the connection of said pressure source to operate said piston devices in accordance with the relative positions of said chart and indicator, said control means including means delaying the connection of said pressure source for operation of any of said piston devices during relative adjustment of said chart and indicator, and including means restricting the operation of said piston devices to operation one at a time.

7. In a machine tool the combination of a feed transmission and a spindle transmission, one of said transmissions comprising a plurality of shiftable rate change devices serially arranged and motion interruptor means adjustable to simultaneously interrupt both said transmissions, shifter means for adjusting said motion interruptor means and shifting said rate change devices, a rate selector including a chart and indicator means movable relative to said chart, a power train for operation of said shifter means, control means for altering the connection of said power train and shifter means to shift said rate change devices in accordance with the relative position of said chart and indicator means, and other control means operative upon relative movement of said chart and indicator means to alter the connection of said power train and shifter means to shift said motion interruptor means to interrupting adjustment.

8. In a machine tool the combination of a feed transmission and a spindle transmission, one of said transmissions comprising serially arranged shiftable rate change devices and motion interruptor means adjustable for simultaneous interruption of both said transmissions, of fluid operable means for adjusting said motion interruptor means and shifting said rate change devices, a rate selector including a chart and indicator means movable relative to said chart, a source of pressure fluid for operation of said fluid operable means, valve means operable to alter the connection of said pressure source and fluid operable means to shift said rate change in accordance with the relative position of said chart and indicator means, and other control means operative upon relative movement of said chart and indicator means to alter the connection of said pressure source and fluid operable means to shift said motion interruptor to interrupting adjustment.

9. In a machine tool the combination of a feed transmission and a spindle transmission, one of said transmissions including a plurality of shiftable rate change devices serially arranged and motion interruptor means alternatively operable for simultaneous connection or simultaneous interruption of both said transmissions, power operable shifter means for adjusting said motion interruptor and shifting said rate change devices, a rate selector including a chart and indicator means movable relative to said chart, a power train for operation of said shifter means, control means operative for the connection of said power train and shifter means to operate said rate change devices in accordance with the relative position of said chart and indicator means, a second control means operable upon relative movement of said chart and indicator means to alter the connection of said power train, and shifter means for shifting said interruptor means to a position interrupting both said transmissions, and a third control means operative subsequent to the shifting of said rate change devices to alter the connection of said power train and shifter means to shift said interruptor means to an adjustment connecting both said transmissions.

10. In a machine tool the combination of a feed transmission and a spindle transmission, one of said transmissions comprising a plurality of shiftable rate change devices serially arranged and motion interruptor means alternatively adjustable for simultaneous connection or simultaneous interruption of both said transmissions, fluid operable shifter means for adjustment of said motion means and shifting of said rate change devices, a rate selector including a chart and indicator means movable relative to said chart, a source of pressure fluid for operation of said shifter means, a first control means including valve means controlling the connection of said pressure source and shifter means to shift said piston devices in accordance with the relative position of said chart and indicator means, a second control means operative upon relative movement of said chart and indicator means to alter the connection of said pressure source and shifter means for adjusting said interruptor means to a position interrupting both said transmissions, and a third control means operative subsequent to the shifting of said rate change devices to alter the connection of said source and shifter means to shift said interruptor to an adjustment connecting both said transmissions.

11. In a machine tool the combination of transmission mechanism including a motion reverser having a motion interrupting adjustment and a rate changer comprising a plurality of speed change elements shiftable into a variety of different position combinations productive respectively of different speeds, a control member movable to a variety of positions respectively corresponding to different of said position combinations, connections operative in each of said positions of said member to effect one of said element position combinations, said connections being operative to effect another element position combination when said member is moved from one of said positions to another, and connections operative upon said member movement from one to another position to shift said motion reverser to motion interrupting adjustment.

12. In a machine tool the combination of transmission mechanism including a motion reverser having a motion interrupting adjustment and a rate changer comprising a plurality of speed change elements shiftable into a variety of different position combinations respectively productive of different speeds, power operable shifter means for shifting said reverser and adjusting said elements, power means for said power operable devices, a selector member movable to a variety of positions respectively corresponding to different of said element position combinations, means operative in each of said positions of said selector member to alter the connection of said power means and shifter means to effect the corresponding element position combination, and means operative upon movement of said selector member from one to another of its positions to alter the connection of said power means and shifter means to effect the motion interrupting reverser adjustment.

13. In a machine tool the combination of transmission mechanism including a motion reverser having a motion interrupting adjustment and a rate changer comprising a plurality of speed change elements shiftable into a variety of position combinations respectively productive of different speeds, fluid operable devices for adjusting said reverser and shifting said elements, a selector member movable to a variety of positions respectively corresponding to different element position combinations, a pressure fluid supply source, valve means operative in each of said positions of said selector member to effect a connection of said pressure source and fluid operable devices to effect the element position combination corresponding to the selector position, and means operative upon movement of said selector member from one to another of said positions to alter the connection of said pressure source and fluid operable devices to effect the motion interrupting adjustment of the reverser.

14. In a machine tool the combination of transmission mechanism including motion reverser means having a motion interrupting position and a rate changer comprising a plurality of speed change elements shiftable into a variety of different position combinations productive respectively of different speeds, a control member movable to a variety of positions respectively corresponding to different position combinations of said elements, connections operative in each of said positions of said control member to effect one of said element position combinations, said connections being operative to effect another element position combination upon movement of said member from one of said positions to another, connections operative upon said member movement from one to another position to shift said motion reverser means from either previous engaged position to interrupting position, and connections operative subsequent to said change in element position to return said reverser means to said previous engaged position.

15. In a machine tool the combination of transmission mechanism including motion reverser means having a motion interrupting position and a rate changer comprising a plurality of speed change elements shiftable into a variety of different position combinations respectively productive of different speeds, power operable devices for shifting said reverser means and elements, power means connectible with said power operable devices, a selector movable to a variety of positions respectively corresponding to different of said element position combinations, means operative in each of said positions of said selector to connect the power means with some of said devices to effect the element position combination corresponding to the selector position, means operative upon movement of said selector from one to another of said positions to change the connection of said power means and devices to shift said reverser means from either previous engaged position to said interrupting position, and subsequent means operative to the shifting of said element in each of said positions of said selector to change the connection of said power means and devices for return of the reverser means to said previous engaged position.

16. In a machine tool the combination of transmission mechanism including motion reverser means having a motion interrupting position and a rate changer comprising a plurality of speed change elements shiftable into a variety of position combinations respectively productive of different speeds, fluid operable devices for shifting said reverser means and elements, a selector movable to a variety of positions respectively corresponding to different of said element position combinations, a pressure fluid supply source for operation of said devices, valve means operative in each of said positions of said selector to effect a connection of said pressure source and devices to effect the element position combination corresponding to the selector position, means operative upon movement of said selector from one to another of said positions to alter the connection of said pressure source and devices to shift said reverser means from either previous engaged position to interrupting position, and other means operative in each of the positions of said selector subsequent to the shifting of said elements to alter the connection of said pressure source and devices for return of the reverser means to said previous engaged position.

17. In a machine tool the combination of transmission mechanism including a portion having a motion interrupting position and a rate changer comprising a plurality of speed change elements shiftable into a variety of position combinations respectively, effective for different speeds, brake means operative on said transmission, power operable devices for shifting said portion, said elements, and said brake means, a selector movable to a variety of positions respectively corresponding to different of said position combinations, a power source for operation of said devices, control means positioned in accordance with the position of said selector to connect said power source and devices to effect the position combination of said elements corresponding to the position of the selector, control means operative upon movement of said selector from one position to another to alter the connection of said power source and devices to effect the motion interrupting position of said portion, and control means operative in each of said selector positions to connect said power source and devices to apply said brake means substantially immediately subsequent to the shifting of said portion.

18. In a machine tool the combination of transmission mechanism including a portion having a motion interrupting position and a rate changer comprising a plurality of speed change elements shiftable into a variety of position combinations respectively effective for different speeds, brake means operative on said transmission, fluid operable devices for shifting said portion, said elements, and said brake means, a selector movable to a variety of positions respectively corresponding to different of said element position combinations, a source of fluid pressure supply for said devices, valve means positioned in accordance with the position of said selector to apply said pressure source to said devices to effect the position combination of said elements corresponding to the position of the selector, valve means operative upon movement of said selector member from one to another of said positions to alter the connection of said pressure source to effect the motion interrupting position of said portion, and valve means operative in each of said selector positions to connect said pressure source and devices to apply said brake means substantially immediately following the shifting of said portion.

19. In a lathe the combination of a transmission mechanism including a portion having a motion interrupting position, a rate changer comprising a plurality of speed change elements shiftable into a variety of position combinations respectively effective for different speeds, and a rotatable work spindle, a brake operative on said transmission, power operable devices for shifting said portion, said elements, and said brake, a speed selector movable to a variety of positions respectively corresponding to different of said element position combinations, a power source for operation of said devices, control means operative in accordance with the position of said selector to connect said power source and devices to effect the element position combination corresponding to the position of the selector, control means operative upon movement of said selector from one to another of its positions to alter the connection of said source and devices to effect the motion interrupting position of said portion, and control means operative in each of said selector positions to connect said power source, and devices to apply said brake substantially immediately subsequent to the shifting of said portion.

20. In a lathe having a rotatable work spindle and a feed transmission the combination of a transmission mechanism including a portion having a motion interrupting position, a plurality of speed change elements shiftable into a variety of position combinations respectively effective for different speeds, a rotatable work spindle and a drive member for said feed transmission, all in the order recited, a brake operative on said elements and drive member, power operable devices for shifting said portion, said elements, and said brake, a speed selector movable to a variety of positions respectively corresponding to different of said element position combinations, a power means for operation of said devices, and control means operative at each movement of said selector from one to another of said positions to alter the connection of said power means and devices to shift said portion to interrupting position and substantially simultaneously therewith to shift said brake to braking position, and thereafter to effect the shifting of said elements to the position combination corresponding to the new position of the selector.

21. In a machine tool the combination of transmission mechanism including a portion having a motion interrupting position and a rate changer comprising a plurality of speed change elements shiftable into a variety of position combinations respectively effective for different speeds, a brake operative on said transmission, power operable devices for shifting said portion, said elements, and said brake, a selector movable to a variety of positions respectively corresponding to different of said position combinations, a power source for operation of said devices; and control means operative at each movement of said selector from one to another of said positions to alter the connection of said power source and devices to effect movement of said portion to interrupting position and substantially simultaneously therewith a movement of said brake to braking position, thereafter to release said brake and effect the shifting of said elements to the position combination corresponding to the new position of the selector, and subsequently to return said portion to motion transmitting position.

22. In a machine tool the combination of transmission mechanism including a portion having a motion interrupting position and a rate changer comprising a plurality of speed change elements shiftable into a variety of position combinations respectively effective for different speeds, a brake operative on said transmission, fluid operable devices for shifting said portion, different of said elements, and said brake, a selector movable to a variety of positions respectively corresponding to different of said element position combinations, a source of fluid pressure supply for said devices; and control means including valve means operative at each movement of said selector from one to another of said positions to alter the connection of said pressure source and devices to effect movement of said portion to interrupting position, and substantially simultaneously therewith a movement of said brake to braking position, thereafter to release said brake and effect the shifting of said elements to the position combination corresponding to the new position of the selector, and immediately subsequently to return said portion to motion transmitting position.

23. In a machine tool the combination of transmission mechanism including a feed transmission and a spindle transmission, said transmission mechanism including a portion having a position simultaneously operative to interrupt both said transmissions, a rate changer comprising a plurality of rate change elements shiftable into a variety of position combinations respectively effective for different rates, a brake operative on said transmission mechanism, power operable devices for shifting said portion, of said elements, and said brake, a power means for operation of said devices, a selector movable to a variety of positions respectively corresponding to different of said element position combinations; and control means operative at each movement of said selector from one of said positions to another to alter the connection of said power means and devices to effect movement of said portion to interrupting position and substantially simultaneously therewith a movement of said brake to braking position and thereafter to effect a shifting of said elements to the position combination corresponding to the new position of said selector.

24. In a lathe having a rotatable work spindle and a feed transmission the combination of a transmission mechanism including a portion having a motion interrupting position, a plurality of speed change elements shiftable into a variety of position combinations respectively effective for different speeds, a rotatable work spindle and a drive member for said feed transmission, a brake operative on said elements and drive member, power operable devices for shifting said portion, said elements, and said brake, a speed selector movable to a variety of positions respectively corresponding to different of said element position combinations, a power means for operation of said devices; and control means operative at each movement of said selector from one to another of said positions to alter the connection of said power means and said devices to effect movement of said portion to interrupting position and substantially simultaneously therewith a movement of said brake to braking position and thereafter to release said brake and effect the shifting of said elements to the position combination corresponding to the new position of the selector, and subsequently to return said portion to motion transmitting position.

25. In a machine tool the combination of transmission mechanism including a feed transmission and a spindle transmission, said transmission mechanism including a portion having a position simultaneously operative to interrupt both said transmissions, a rate changer in one of said transmissions comprising a plurality of rate change elements shiftable into a variety of position combinations respectively effective for different rates and a brake operative on said rate changer, power operable devices for shifting said portion, for said elements, and said brake, a power means for operation of said devices, a selector movable to a variety of positions respectively corresponding to different of said element position combinations; and control means operative at each movement of said selector from one of said positions to another to alter the connection of said power means and devices to effect movement of said portion to motion interrupting position and substantially simultaneously therewith a movement of said brake to braking position, thereafter to release said brake and effect the shifting of said elements to the position combination corresponding to the new position of said selector, and subsequently to return said portion to motion transmitting position.

26. In a machine tool the combination of transmission mechanism including a motion reverser having a motion interrupting position and a rate changer comprising a plurality of elements shiftable into a variety of position combinations respectively effective for different speeds, a brake operative on said transmission, power operable devices for shifting said reverser to either driving position or to interrupting position and, for shifting said elements and brake, a selector movable to a variety of positions respectively corresponding to different of said element position combinations, a power source for operation of said devices, and control means operative at each movement of said selector from one to another of said positions to alter the connection of said power source and devices to effect movement of said reverser from either previous driving position to motion interrupting position and substantially simultaneously therewith a movement of said brake to braking position, and thereafter to effect the shifting of said elements to the position combination corresponding to the new position of the selector and to release said brake, and subsequently to return said reverser to its previous driving position.

27. In a machine tool the combination of transmission mechanism including a feed transmission and a spindle transmission, said transmission mechanism including a drive mechanism adjustable to a plurality of positions respectively effecting opposite drive directions and to a motion interrupting position effective on both said transmissions, a rate changer including a plurality of rate change elements shiftable to a variety of position combinations respectively effecting different speeds, and a movable brake effective on both said transmissions, power operable devices for shifting said drive mechanism, said elements and said brake, power means for operation of said devices, a selector movable to a variety of positions respectively corresponding to different of said position combinations; and control means operative at each movement of said selector from one to another of said positions to alter the connection of said power means and devices to adjust said drive mechanism to motion interrupting position and substantially simultaneously therewith to apply said brake, and thereafter to effect the shifting of said elements to the position combination corresponding to the new position of said selector and to release said brake, and subsequently to return said drive mechanism to driving position.

28. In a machine tool the combination of transmission mechanism including a device having a motion interrupting position, a shiftable rate change device productive of a series of rates including a high rate, a low rate, and a plurality of intermediate rates, and a brake device, power operable shifters for shifting each of said devices, power means for cooperation of said shifters, a selector having a plurality of positions respectively corresponding to the rates of said series, and control means operative upon movement of said selector from one to another of said positions to alter the connection of said power means to effect movement of each of said shifters in predetermined sequence and direction, and to effect adjustment of said rate changer to a speed position corresponding to the new position of said selector.

29. In a machine tool the combination of transmission mechanism including a shiftable reverser device, a shiftable rate change device productive of a series of rates including a high rate, a low rate, and a plurality of intermediate rates and a brake device, power operable shifters for shifting each of said devices, power means for operation of said shifters, a selector having a plurality of positions respectively corresponding to the different rates of said series, and control means operative upon movement of said selector from one to another of said positions to apply said power means to effect movement of each of said shifters in predetermined sequence and direction, and to effect adjustment of said rate changer to a speed position corresponding to the new position of said selector.

30. A machine tool as specified in claim 9 including other control means operable for shifting said interruptor to either of its positions independently of the operation of said rate change devices.

31. A machine tool as specified in claim 15 including other control means operable for selectively shifting said reverser means to any of its positions independently of the operation of said element shifting devices.

32. A machine tool as specified in claim 21 including other control means operable for shifting said portion to either of its positions independently of the operation of said selector.

33. In a machine tool the combination of transmission mechanism including a rate changer having a plurality of rate change elements shiftable into a variety of position combinations respectively of different rate effect, a power source, power operable shifter devices connected with the respective rate change elements, control means for connecting said power source with said shifter devices selectively to effect one or another of said position combinations and including a movable selector device, and means preventing movement of said selector device whenever said power source is inoperative.

34. In a machine tool the combination of transmission mechanism including a rate changer having a plurality of rate change elements shiftable into a variety of position combinations respectively productive of different rates, power operable shifter devices respectively for different of said elements, a power source having an interruptible connection for driving said transmission, driving and control means for operating said shifter devices selectively to effect one or another of said position combinations and including a movable selector device, and means preventing movement of said selector device whenever said power source connection is interrupted.

35. In combination, a transmission mechanism including rate change elements shiftable into a variety of position combinations respectively productive of different transmission rates and a motion interruptor, a plurality of power operable devices respectively connected for operation of different of said elements and for operation of said interruptor, a power source connectible for operation of each of said devices, a selector device including members relatively movable to different positions respectively corresponding to different of said element position combinations, selective control means operative from said relative movement to effect different connection combinations of the element operating devices and power source respectively corresponding to different of said element position combinations, other control means operative from said relative movement in advance of each of said connection combinations to connect said power source with the interruptor operating device to move said interruptor to motion interrupting position, and means operative upon the shifting of said elements from one to another of said position combinations to return said interruptor to motion transmitting position.

36. A transmission and control mechanism as specified in claim 35, including control mechanism operative upon relative movement of said selector members to limit the resulting power connection of said element shifting devices to a sequence excluding simultaneous power connection of some of said devices and another thereof.

37. In a machine tool the combination of transmission mechanism including a rate changer having a plurality of rate change elements shiftable into a variety of position combinations respectively productive of different rates, power operable shifter devices for said elements, a power source having an interruptible connection for driving said transmission, power means connectible for operating said shifter devices, control means for connecting said power means to operate said shifter devices selectively from said power means to effect one or another of said element position combinations and including a movable rate selector, means preventing movement of said selector whenever said power source is interrupted, and other means preventing movement of said selector whenever said power means is inoperative.

38. In a machine tool the combination of a feed transmission and a spindle transmission, one of said transmissions including a member shiftable for a plurality of different transmission effects, a selector device including a part movable to different positions respectively corresponding to different of said transmission effects, a power operable shifter for said member, a power source, and control means for the connection of said source and shifter including means for establishing different of said effects in accordance with the position of said selector part, said control means including means operative from movement of said selector part for delaying the connection of said source and shifters during movement of said selector part from one to another of its positions.

39. In a machine tool the combination of a feed transmission and a spindle transmission, one of said transmissions including a member shiftable for a plurality of different transmission effects, a selector device including a part movable to different positions respectively corresponding to different of said transmission effects, a power operable shifter for said member, a power source, and control means for the connection of said source and shifter including means for establishing different of said effects in accordance with the position of said selector part, said control means including means operative from movement of said selector part for delaying the connection of said source and shifter for a predetermined interval following movement of said selector part from one to another of its positions.

40. In a machine tool the combination of a feed transmission and a spindle transmission, one of said transmissions including a member shiftable for a plurality of different transmission effects, a selector device including a part movable to different positions respectively corresponding to different of said transmission effects, a power operable shifter for said member, a power source, and control means for the connection of said source and shifter including means for establishing different of said effects in accordance with the position of said selector part, said control means including means operative from movement of said selector part for delaying connection of said source and shifter during movement of said selector part from one to another of its positions and for a predetermined interval thereafter.

41. A machine tool as specified in claim 28, including other control means for operation of said interrupting device independently of operation of said rate change device.

42. A machine tool as specified in claim 29, including other control means for operation of said reverser device independently of the operation of said rate change device.

43. In a machine tool the combination of a transmission providing a shiftable driving member having right and left driving positions and another driving position therebetween, said driving positions being respectively productive of different driving effects, said member also having intermediate non-driving positions between said other position and said right and left positions respectively, and means for shifting said member including a selector shiftable to positions respectively corresponding to different of said driving positions of said member, a power operable shifter for operation of said member, a power source for operation of said shifter, and control means operative for connection of said source and shifter to effect movement of said member from any of said driving positions into any other thereof in accordance with the position of said selector member.

44. In a machine tool the combination of a transmission providing a shiftable driving member having right and left driving positions and another driving position therebetween, said driving positions being respectively productive of different driving effects, said member also having intermediate non-driving positions between said other position and said right and left positions respectively, a selector having positions corresponding respectively to the different driving positions of said member, a fluid operable shifter for said member, a pressure fluid source for operation of said shifter, and valve means operative following movement of said selector from one to another of its positions for connection of said source and shifter to effect movement of said member from any of said driving positions to the driving position corresponding to the new position of the selector.

45. In a machine tool the combination of a transmission including a power source and a plurality of rate change elements driven from said source and shiftable into a variety of position combinations respectively productive of different rates, a selector movable into a plurality of positions respectively corresponding to different of said position combinations, shifter means operable in each of said positions of said selector means to effect the position combination of said elements to correspond with the selector position, and other control means operative upon movement of said selector from one to another position to interrupt the driving connection of said source and elements.

46. In a machine tool the combination of transmission mechanism including a portion having a motion interrupting position and a rate changer comprising a plurality of speed change elements shiftable into a variety of position combinations respectively effective for different speeds, brake means operative on said transmission, power operable devices for shifting said portion, said elements and said brake means, a selector movable to a variety of positions respectively corresponding to different of said position combinations, a power source for operation of said devices, control means positioned in accordance with the position of said selector to connect said power source and devices to effect the position combination of said elements corresponding to the position of the selector, control means operative upon movement of said selector from one position to another to alter the connection of said power source and devices to effect the motion interrupting position of said portion, and control means operative in each of said selector positions to connect said power source and devices to apply said brake means substantially immediately subsequent to the shifting of said portion and to later release said brake means.

47. In a machine tool the combination of transmission mechanism including a portion having a motion interrupting position and a rate changer comprising a plurality of speed change elements shiftable into a variety of position combinations respectively effective for different speeds, brake means operative on said transmission, fluid operable devices for shifting said portion, said elements and said brake means, a selector movable to a variety of positions respectively corresponding to different of said element position combinations, a source of fluid pressure supply for said devices, valve means positioned in accordance with the position of said selector to apply said pressure source to said devices to effect the position combination of said elements corresponding to the position of the selector, valve means operative upon movement of said selector member from one to another of said positions to alter the connection of said pressure source to effect the motion interrupting position of said portion, and valve means operative in each of said selector positions to connect said pressure source and devices to apply said brake means substantially immediately following the shifting of said portion and to later release said brake means.

48. In a machine tool the combination of a support, a transmission therefor including reversing means shiftable to forward, reverse and motion interrupting positions, shifting means for said reverser, a power train connectible for operation of said shifter, a controller for effecting connection of said power train and shifter to selectively effect said reverser positions and including a part movable to positions respectively corresponding to the reverser positions, a brake for said transmission having engaged and released positions, a brake shifter, power means connectible for operation of said brake shifter, and means controlling the connection of said power means and brake shifter in accordance with the position of said controller part and operative to effect a released position of said brake in both forward and reverse positions of said reverser and to engage said brake in the motion interrupting reverser position.

49. In a machine tool the combination of a support, a transmission therefor including reversing means shiftable to forward, reverse and motion interrupting positions, shifting means for said reverser including a controller having three positions respectively corresponding to said reverser positions, a brake for said transmission having engaged and released positions, a brake shifter, power means connectible for operation of said brake shifter, and means controlling the connection of said power means and brake shifter in accordance with the position of said controller member and operative to effect a released position of said brake in both forward and reversed positions of said reverser and to engage said brake in the motion interrupting reverser position.

WERNER IRVING SENGER.

CERTIFICATE OF CORRECTION.

Patent No. 2,054,141.
September 15, 1936.

WERNER IRVING SENGER.

It is hereby certified that error appears in the printed specification of the above numbered patent requiring correction as follows: Page 7, first column, line 70, claim 10, before the word "means" insert interruptor; and second column, line 39, claim 12, for "shifting" read adjusting; and for "adjusting" read shifting; page 8, first column, line 42, claim 15, before "means" strike out "subsequent" and insert the same after "operative", same line and claim; page 9, second column, line 9, claim 23, strike out "of"; page 10, first column, line 60, claim 28, for "cooperation" read operation; line 62, same claim, before "rates" insert different; and that the said Letters Patent should be read with these corrections therein that the same may conform to the record of the case in the Patent Office.

Signed and sealed this 3rd day of November, A. D. 1936.

Henry Van Arsdale
Acting Commissioner of Patents.

(Seal)

ments and said brake means, a selector movable to a variety of positions respectively corresponding to different of said position combinations, a power source for operation of said devices, control means positioned in accordance with the position of said selector to connect said power source and devices to effect the position combination of said elements corresponding to the position of the selector, control means operative upon movement of said selector from one position to another to alter the connection of said power source and devices to effect the motion interrupting position of said portion, and control means operative in each of said selector positions to connect said power source and devices to apply said brake means substantially immediately subsequent to the shifting of said portion and to later release said brake means.

47. In a machine tool the combination of transmission mechanism including a portion having a motion interrupting position and a rate changer comprising a plurality of speed change elements shiftable into a variety of position combinations respectively effective for different speeds, brake means operative on said transmission, fluid operable devices for shifting said portion, said elements and said brake means, a selector movable to a variety of positions respectively corresponding to different of said element position combinations, a source of fluid pressure supply for said devices, valve means positioned in accordance with the position of said selector to apply said pressure source to said devices to effect the position combination of said elements corresponding to the position of the selector, valve means operative upon movement of said selector member from one to another of said positions to alter the connection of said pressure source to effect the motion interrupting position of said portion, and valve means operative in each of said selector positions to connect said pressure source and devices to apply said brake means substantially immediately following the shifting of said portion and to later release said brake means.

48. In a machine tool the combination of a support, a transmission therefor including reversing means shiftable to forward, reverse and motion interrupting positions, shifting means for said reverser, a power train connectible for operation of said shifter, a controller for effecting connection of said power train and shifter to selectively effect said reverser positions and including a part movable to positions respectively corresponding to the reverser positions, a brake for said transmission having engaged and released positions, a brake shifter, power means connectible for operation of said brake shifter, and means controlling the connection of said power means and brake shifter in accordance with the position of said controller part and operative to effect a released position of said brake in both forward and reverse positions of said reverser and to engage said brake in the motion interrupting reverser position.

49. In a machine tool the combination of a support, a transmission therefor including reversing means shiftable to forward, reverse and motion interrupting positions, shifting means for said reverser including a controller having three positions respectively corresponding to said reverser positions, a brake for said transmission having engaged and released positions, a brake shifter, power means connectible for operation of said brake shifter, and means controlling the connection of said power means and brake shifter in accordance with the position of said controller member and operative to effect a released position of said brake in both forward and reversed positions of said reverser and to engage said brake in the motion interrupting reverser position.

WERNER IRVING SENGER.

CERTIFICATE OF CORRECTION.

Patent No. 2,054,141.                                        September 15, 1936.

WERNER IRVING SENGER.

It is hereby certified that error appears in the printed specification of the above numbered patent requiring correction as follows: Page 7, first column, line 70, claim 10, before the word "means" insert interruptor; and second column, line 39, claim 12, for "shifting" read adjusting; and for "adjusting" read shifting; page 8, first column, line 42, claim 15, before "means" strike out "subsequent" and insert the same after "operative", same line and claim; page 9, second column, line 9, claim 23, strike out "of"; page 10, first column, line 60, claim 28, for "cooperation" read operation; line 62, same claim, before "rates" insert different; and that the said Letters Patent should be read with these corrections therein that the same may conform to the record of the case in the Patent Office.

Signed and sealed this 3rd day of November, A. D. 1936.

Henry Van Arsdale
Acting Commissioner of Patents.

(Seal)

Patent No. 2,054,141. September 15, 1936.

WERNER IRVING SENGER.

It is hereby certified that error appears in the printed specification of the above numbered patent requiring correction as follows: Page 7, first column, line 70, claim 10, before the word "means" insert interruptor; and second column, line 39, claim 12, for "shifting" read adjusting; and for "adjusting" read shifting; page 8, first column, line 42, claim 15, before "means" strike out "subsequent" and insert the same after "operative", same line and claim; page 9, second column, line 9, claim 23, strike out "of"; page 10, first column, line 60, claim 28, for "cooperation" read operation; line 62, same claim, before "rates" insert different; and that the said Letters Patent should be read with these corrections therein that the same may conform to the record of the case in the Patent Office.

Signed and sealed this 3rd day of November, A. D. 1936.

(Seal)

Henry Van Arsdale
Acting Commissioner of Patents.